United States Patent [19]

Boisvert

[11] Patent Number: 4,639,023

[45] Date of Patent: Jan. 27, 1987

[54] PIVOTABLE LOCKING BAR FOR PATIO DOORS

[76] Inventor: Richard Boisvert, 7150 MB Jodoin Street, app. 703, Ville d'Anjou, Canada, H1J 2J3

[21] Appl. No.: 739,102

[22] Filed: May 30, 1985

[51] Int. Cl.[4] .............................................. E05C 17/04
[52] U.S. Cl. ........................................ 292/262; 70/94; 292/337; 292/338; 292/DIG. 19; 292/DIG. 38
[58] Field of Search ............... 292/262, 209, DIG. 46, 292/DIG. 15, DIG. 38, DIG. 19, DIG. 51, 337, DIG. 61, 275, 338; 70/94, 95, 100

[56] References Cited

U.S. PATENT DOCUMENTS

| 1,481,501 | 1/1924 | Britten et al. | 292/209 X |
| 2,035,666 | 3/1936 | Parkins | 292/209 X |
| 3,117,689 | 1/1964 | Dedic, Sr. | 292/262 |
| 3,328,920 | 7/1967 | Cohen et al. | 292/262 |
| 3,797,005 | 3/1974 | Schwarz | 292/262 X |
| 4,015,867 | 4/1977 | Siden | 292/262 |
| 4,461,502 | 7/1984 | Burgess | 292/262 |

FOREIGN PATENT DOCUMENTS

| 721031 | 11/1965 | Canada | 292/209 |
| 369939 | 2/1923 | Fed. Rep. of Germany | 292/209 |
| 15779 | of 1913 | United Kingdom | 292/209 |
| 285700 | 2/1928 | United Kingdom | 292/262 |
| 1566615 | 5/1980 | United Kingdom | 292/262 |

Primary Examiner—Robert L. Wolfe
Assistant Examiner—Lloyd A. Gall

[57] ABSTRACT

The locking bar assembly of the present invention is adapted to lock horizontally slidable, overlapping window doors, such as patio doors, in closed position. One end of a locking bar is pivoted to a bracket, or pivotal member, for movement in between a stored vertical position and a horizontal locking position. A clasping member, carried by the bracket, resiliently retains the locking bar either in the vertical position, or against upward pivoting from its horizontal position. The bracket is so constructed that it can be secured to the sash or to the handle flange of one door when the two doors can be opened, or to the door opening frame when only one door can be opened.

3 Claims, 18 Drawing Figures

PIVOTABLE LOCKING BAR FOR PATIO DOORS

FIELD OF THE INVENTION

This invention relates in general to locking means for sliding panels, and more specifically to a pivotable locking bar for patio doors.

BACKGROUND OF THE INVENTION

The conventional patio doors each include a glass panel in a sash, with at least one door being capable of sliding movement relative to the other within tracks at the top and bottom of the door opening frame.

These patio doors are very appealing, for their ease of opening a relatively large area and for the amount of daylight illumination provided. However, these patio doors are relatively easy to open by unauthorized individuals when provided with a lock. Of course, the underlying assumption for all these lock mechanisms to be effective is that an intruder will never resort to smash the entire glass panel to gain entry into the dwelling, because the noise caused by the blow and falling of glass on the ground would constitute appropriate deterrence for the intruder.

Standard security locks have fingers engageable with selected notches in the top edges of the panels in their closed position, which is secured by an ordinary key-operated cylinder lock. These locks can be forced by the pry of a crowbar or wedge, and can be disengaged by forcing steel chisels through the outer frames at the position of the lock.

In the last decade or so, a number of locking bars have appeared in the field, mounted to the fixed patio door at waist height, for pivotal movement around a pivotal member from an unlocked vertical position to a locked horizontal position. In locked horizontal position, the locking bar effectively prevents opening of the slidable patio door, by extending in between the outer sash of the latter and the opposite door jamb.

These pivotal members for the locking security bars are obviously critical in the efficiency of prevention of unauthorized ingress, but have remained quite primitive in their design. It is believed that some improvement could be brought to such a pivotal member.

OBJECTS OF THE INVENTION

Accordingly, the main object of the invention is to provide an improved pivotal member for a patio door locking bar, adapted to resiliently retain the locking bar in vertical position without having to fix a separate retainer member to the door or to the frame of the door opening.

Another object of the present invention is to provide the above pivotal member with means to prevent injuries of small children during pivotal thereof.

A further object of the invention is to provide such a locking bar assembly that will be adaptable to single- or double-hung glass panel patio doors.

Still another object of this invention is to provide such a locking bar assembly that will be adaptable to patio doors which are both slidable or else only one is slidable.

Another object of the invention is to provide a locking bar assembly which can be mounted on the door opening frame, on the glass door sash or on the handle of the latter.

Yet, another object of the invention is to provide a pivotal member which resiliently retains the locking bar against upward pivoting from its horizontal position and which provides a bumper member for the slidable door.

SUMMARY OF THE INVENTION

The locking assembly of the present invention is adapted to lock in closed position horizontally slidable panels, such as patio doors.

The locking assembly comprises an elongated locking member and pivotal means, the locking member pivotable between a stored vertical position and a horizontal locking position. The locking member locks the panels against opposite vertical surfaces, wherein ingress of a person is thereby prevented therethrough, except of course if smashing of the entire panel is resorted to. The pivotal means further includes a stabilizing member, adapted to resiliently retain the locking member in vertical position and preferably also against upward pivoting from its horizontal position. The locking assembly can be used in association with patio doors which may be single- or double-glazed and having a sash with or without a right angle handle flange, and in which one or both doors can be opened. When both the inner and outer doors are openable, the pivotal means is secured either on the inside of the sash or on the inner handle flange of the outer door. If the outer door cannot be opened, then the pivot means is secured on the door frame jamb adjacent the outer door.

Each pivotal means comprises an open casing of U-shape cross-section, defining a base plate and first and second transversely-bored side plates. The side plates hold a transverse shaft for pivotal action of the locking member or bar.

The stabilizing member includes an intermediate plate fixedly secured flatly on the base plate, and intermediate the transverse shaft and the base plate. The stabilizer member further includes a pair of transversely-spaced resilient clasping arms integral with and projecting from said intermediate plate between said side plates and the bar and above the transverse shaft. Each clasping arm is provided with terminal inner shoulders biased towards the bar and overlapping the underface of the locking bar in the vertical limit position of the latter. Said shoulders preferably also overlap the top face of the locking bar in its horizontal limit position. A certain force must therefore be exerted to pivot the bar to its vertical limit position, since the bar must spread two arms apart for its passage therebetween. The intermediate plate further carries a bottom tongue, projecting in between the side plates below the transverse shaft and carrying a bumper body made of a shock-absorbing material.

A transverse ridge is also envisioned to project upwardly from the bumper body, and is adapted to contact the locking bar when in its horizontal position. A further important goal of this transverse ridge is to prevent injuries of small children, which may playfully insert one finger in between the locking bar and the above tongue. Of course, they are unconscious of the danger of cutting their finger if they could be concurrently tempted to lift the locking bar while their finger was in.

The pivotal member or bracket and stabilizing member are provided with means for securing the same directly to a door sash or to the door handle flange, or to a door opening frame.

DETAILED DESCRIPTION OF THE PREFERRED EMBODIMENT

Figures 1, 2:
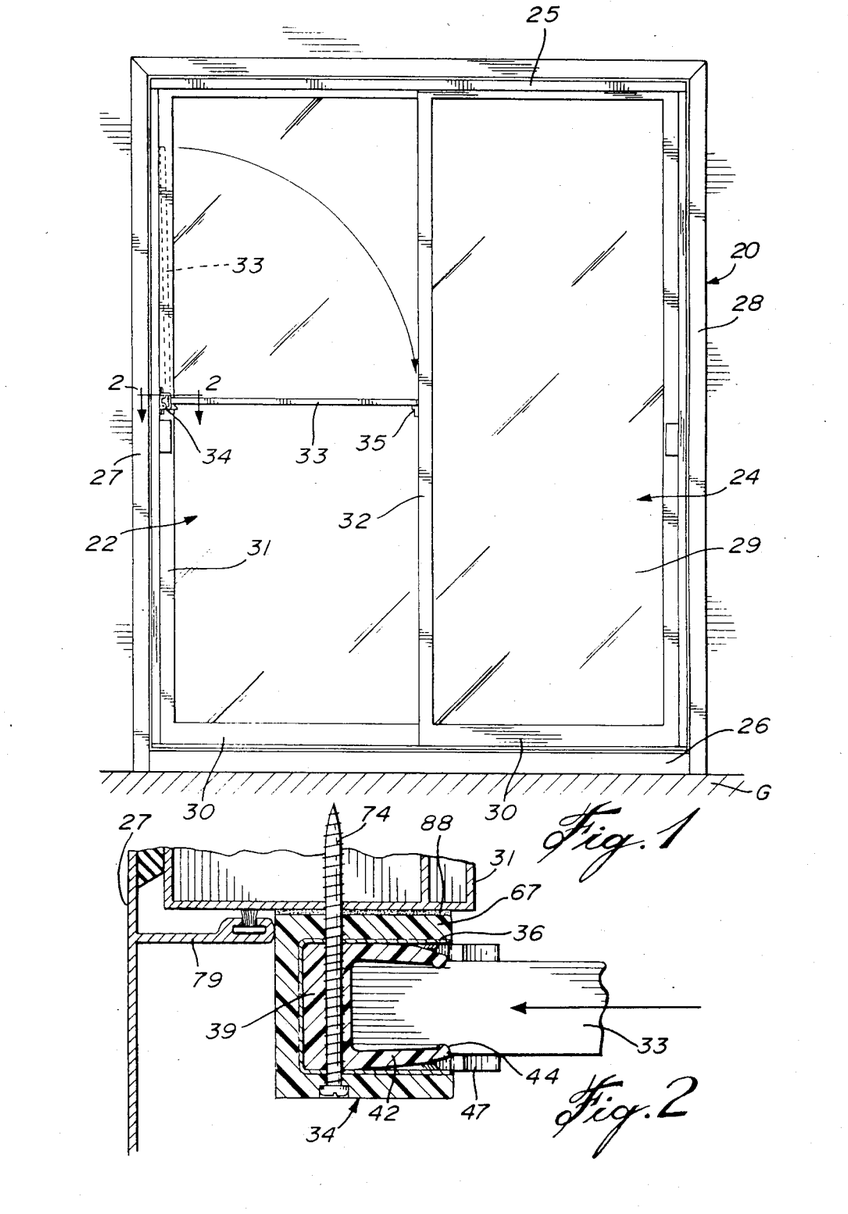
FIG. 1 is an elevation of the inner side of slidable patio doors in their associated door opening frame and provided with the locking bar of the assembly of the invention shown in its locked horizontal position in full lines and in upright stored position in dotted lines.
FIG. 2 is a horizontal sectional view of the pivotal member or bracket as secured directly to the sash of one door, showing also the locking bar in horizontal position, this section taken along line 2—2 of FIG. 1.

FIG. 1 shows a conventional patio door assembly comprising a door opening frame 20 upstanding from the ground or floor G and two patio doors 22, 24 horizontally slidable along rails in the door lintel 25 and door sill 26 between jambs 27 and 28. As shown, the left-hand door 22 is the outer door and the right-hand door 24 is the inner door. Those doors are slidable in offset planes to an open overlapping position. Each door 22 and 24 includes one or more glass panes 29 glazing a door sash 30, each including outer and inner vertical sash members 31 and 32, respectively, the two inner sash members 32 being in registering relation when the two doors are in closed position.

The locking bar assembly of the invention, as shown in FIG. 1, includes a locking bar proper, indicated at 33, preferably made of tubular metal material, for instance of square cross-section, the inner end of which is pivotally mounted on a pivotal bracket 34, which is adapted to be secured either to a door jamb 27 or 28, or to a door sash.

In FIG. 1, the bracket 34 is directly secured to a door sash at approximately waist-height and the locking bar 33 is arranged to pivot in a vertical plane between a lower horizontal locking position, shown in full line in FIG. 1, and a stored vertical position, shown in dotted line in FIG. 1. In said stored position, the two doors can be opened. The locking bar assembly further includes a bar support member 35, which, in FIG. 1, is secured to the inner vertical sash portion 32 of the inner door 24 to engage the underside of the free end of the locking bar when in horizontal locking position. The bracket assembly 34 is more particularly shown in FIGS. 2 to 5. It essentially consists of U-shape metallic casing 36 consisting of a base plate 37 and parallel side walls 38, between which fits a body 39 integrally made of resilient material, preferably a synthetic resin, and including a base plate 40 forming a thickened lower portion 41 and provided at its upper end with a pair of forwardly-protruding transversely parallel clasping arms 42 integral with a thickened upper portion 43. Since body 39 is made of synthetic resin, with a certain resiliency, the clasping arms 42 are themselves resilient and can be spread apart, but will return to a normal position in which the distance between the two shoulders 44 formed at the outer ends of the two clasping arms will be less than the width of the locking bar 33. At its inner end portion, thickened lower portion 41 is provided with a forwardly-projecting flat tongue 45, which has a friction fit with the bore 46 of a bumper body 47, preferably made of elastomeric material, of generally rectangular shape and provided with an upwardly-protruding transverse ridge 48.

Body 39 is fitted within the casing 36 in a precise position as determined by circular studs 49 protruding rearwardly from the base plate 40 of body 39 and precisely engaging circular holes 50 made in the base plate 37 of casing 36. The exact positioning and retaining of body 39 within the casing 36 is further obtained by the inturned ears 51 inwardly protruding towards each other from the top edge of the side walls 38 adjacent base plate 37 and overlapping and contacting the top face of the thickened upper portion 43 of base plate 40, as clearly shown in FIGS. 4, 5, and 6.

Figures 3, 4:
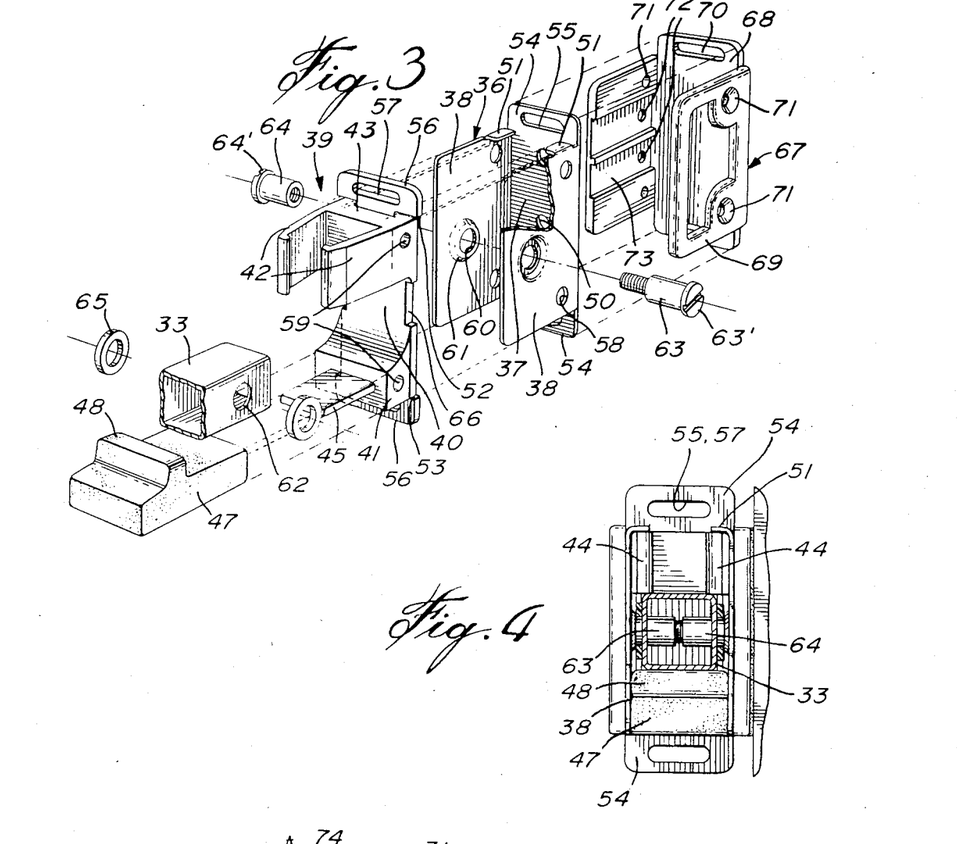
FIG. 3 is an exploded perspective view of the bracket assembly and showing the locking bar cut away.
FIG. 4 is a vertical section taken along line 4—4 of FIG. 8.

Body 39 is further retained in precise position in casing 36 due to the presence of upper and lower side shoulders 52 and 53 formed at the side edges of the base plate 40 of body 39, as shown in FIG. 3, which engages and overlaps the top and bottom edges of the side walls 38 of casing 36 in the assembled position of the two members. Base plate 37 has an upper and a lower extension 54, each providing with a transverse slot 55. Similarly, base plate 40 of body 39 has an upper and a lower extension 56, each provided with a transverse slot 57. When the body 39 is assembled with casing 36, slots 55 and 57 register with one another and at the top and bottom of the assembly to receive an anchoring bolt or screw for securing the bracket assembly to a backing surface. The side walls 38 of casing 36 are provided with two pairs of transversely-registering holes 58, which also register with transverse upper and lower through bore 59 in the assembled position of the casing 36 and body 39. Through bores 59 are made through the thickened upper portion 43 and lower portion 41 of the body 39. Therefore, the assembly of casing 36 and body 39 can be anchored to a lateral supporting surface by means of bolts or screws extending through the holes 58 and bores 59. Both side walls 38 are provided with a pivot hole 60 with the metal surrounding each pivot hole 60 inwardly upset, as shown at 61.

The inner end of locking bar 33 is provided with registering pivot holes 62, which register with the pivot holes 60 of casing 36 for receiving a pivot bolt 63 and a pivot nut 64, the nut having inner threads for receiving the outer threads of the bolt 63, both the bolt and nut forming a cylindrical smooth portion in sliding contact with the edges of the pivot holes. The head 63' of the bolt 63 and the head 64' of the nut 64 engage the recess formed by the respective upset portion 61, so that the heads will be flush with the outside surface of the side walls 38 when the bolt and nut are assembled and tightened.

A washer 65 is interposed between each side of the bar 33 and the respective upset portion 61 to positively guide the bar in its pivotal movement and to prevent lateral play of the bar with respect to the side walls 38. The base plate 40 of body 39 is provided with side notches 66 to clear the upset portion 61 of the side walls 38 when assembling casing 36 with body 39.

If desired, although it has not been found to be necessary, the whole assembly of the casing 36 and body 39 can be enclosed in a U-shaped cover 67, made, for instance, of strong plastic material and consisting of a base plate 68 to engage flat against the base plate 37 of casing 36 and of external side walls 69 to engage on the outside of the side walls 38 of casing 36. Base plate 68 has upper and lower extensions each with a transverse slot 70 to register with transverse slots 55 and 57. Side walls 69 have two pairs of transversely-registering holes 71 to register with the side holes 58 and through bores 59 for securing the whole assembly to a side-supporting surface. However, one of the side walls 69 is provided with an additional pair of holes 72 for initially securing the cover 67 to a side-supporting surface by means of bolts, screws or the like, the heads of which are recessed within grooves 73 at the inside surface of the side wall 69. Thus once the cover 67 is secured to a side-supporting surface, the assembly of casing 36, body 39 and the pivoted locking bar 33 can be inserted within the cover 67 and the resulting assembly screwed to a side-supporting surface by bolts or screws passing through holes 71, 58, and bores 59.

Obviously, casing 36 with body 39 can be directly secured to a side-supporting surface or to a backing surface without the use of the reinforcing cover 67. In practice, cover 67 is desirable only when the bracket is secured to a side-supporting surface as in the case of FIGS. 5 to 9 and only when it is expected that screws 74, which extend through holes 71, 58, will be subjected to large shearing forces.

Figures 6, 10:
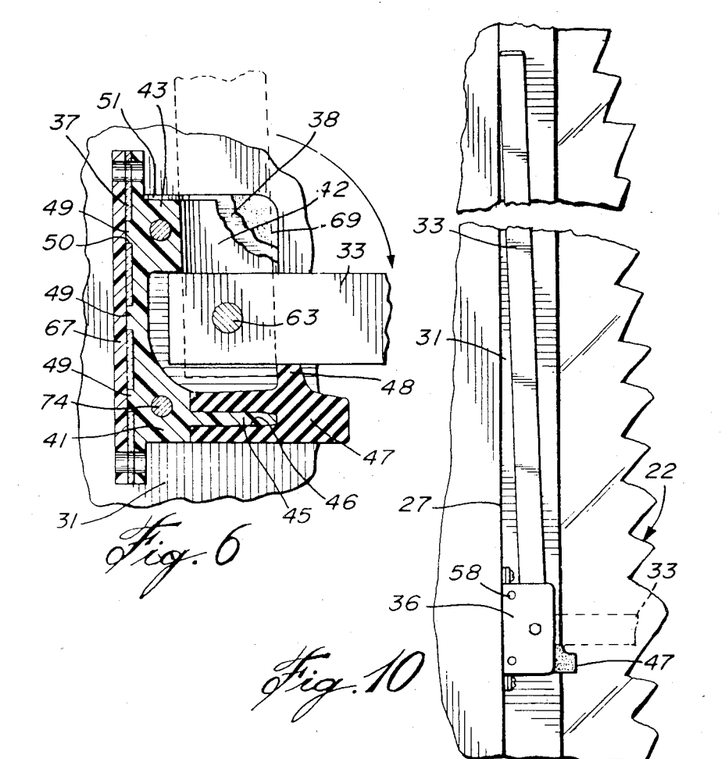
FIG. 6 is a vertical section of the bracket with part of the locking bar shown in full line in horizontal locking position and in dotted line in vertical stored position.
FIG. 10, seen on the third sheet of drawings, is a partial elevation of the door opening frame and of the bracket shown secured thereto, with the locking bar in vertical stored position.
Figure 7:
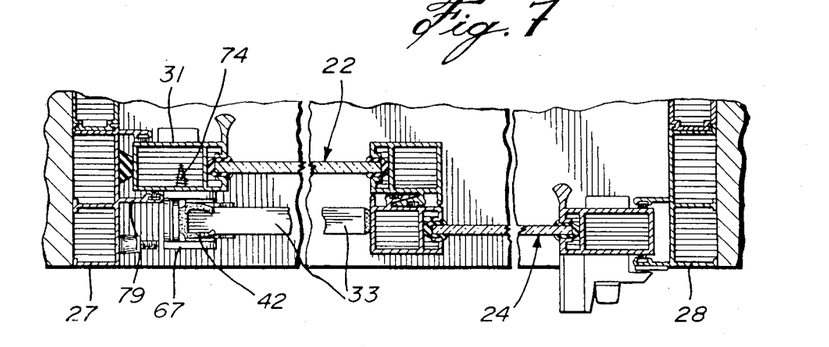
FIG. 7, shown on the fourth sheet of drawings, is a plan section of the patio door assembly, with the locking bar assembly directly secured to the sash of one door and with the locking bar in horizontal locking position.
Figure 8:
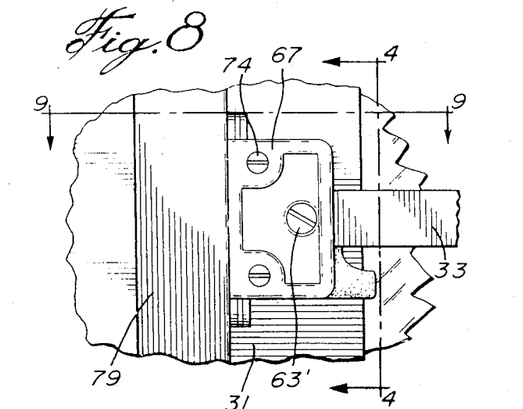
FIG. 8 is a partial elevation of the portion of the patio door arrangement provided with a locking bar assembly of the invention as fixed to the door sash.
Figure 9:
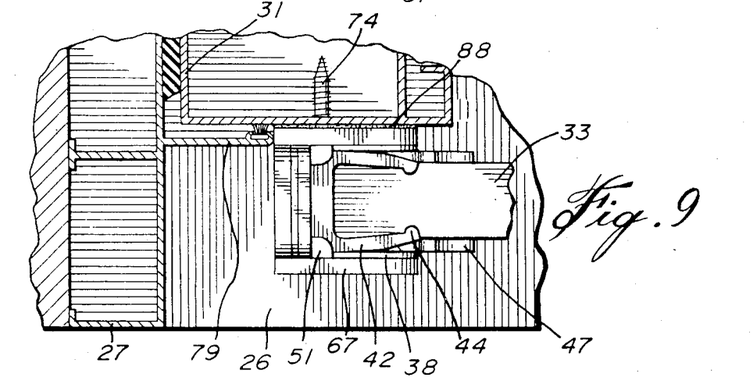
FIG. 9 is a plan section taken along line 9—9 of FIG. 8.

Referring to FIG. 6, it will be noted that in the horizontal locking position of the locking bar 33, ridge 48 contacts the underside of the locking bar, so as to maintain the locking bar in generally horizontal position and also to prevent insertion of objects in the free space below the pivot bolt 63 and underneath the locking bar. In its horizontal position, the inner end of the locking bar also abuts against the underside of the thickened upper portion 43 of the plastic body 39, again generally maintaining the bar in horizontal position.

Figure 5:
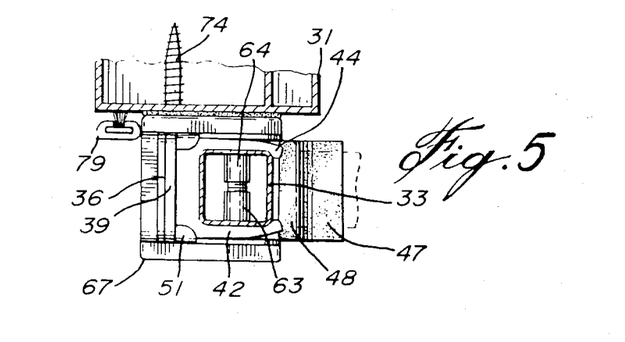
FIG. 5 is a view similar to that of FIG. 2 but showing the bracket assembly in top plan view and showing the locking bar in section and in vertical stored position.

In the generally vertical position of the locking bar 33, its lower inner corner abuts against the back face of the ridge 48 and its top face abuts against the front face of the thickened upper portion 43. Again, objects cannot be inserted within the space below the pivot bolt 63. Also, the thickened upper portion 43 acts as a stop for the stored bar to prevent its rotation passed a generally vertical position. The bar is resiliently retained in this latter position by the clasping arms 42, as shown in FIG. 5, the end shoulders 44 of which overlap the underside of the bar. To pivot the bar downwardly to its horizontal locking position, a certain force must be exerted on the bar to spread out the clasping arms 42, in order that they will clear the bar. Once the bar reaches its horizontal locking position, the clasping arms 42 are cleared of the bar and move towards each other to overlap the top side of the bar, as clearly shown in FIG. 2, thus resiliently restraining the bar against upward movement.

Figure 15:
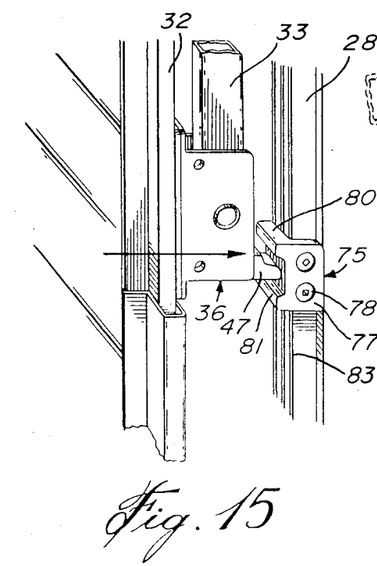
FIG. 15 is a partial perspective view of a patio door in open position, with the locking bar in vertical stored position and showing how the bumper associated with the pivotal bracket abuts the locking bar support secured to the opposite jamb of the door-opening frame.
Figure 16:
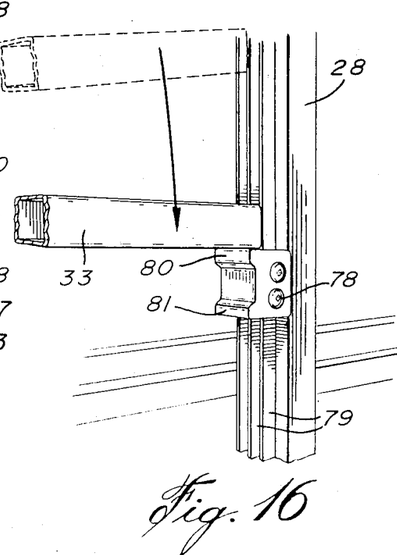
FIG. 16 is a partial perspective view of the arrangement of FIG. 15, but showing the locking bar in locking position and abutting on the locking bar support.
Figures 17, 18:
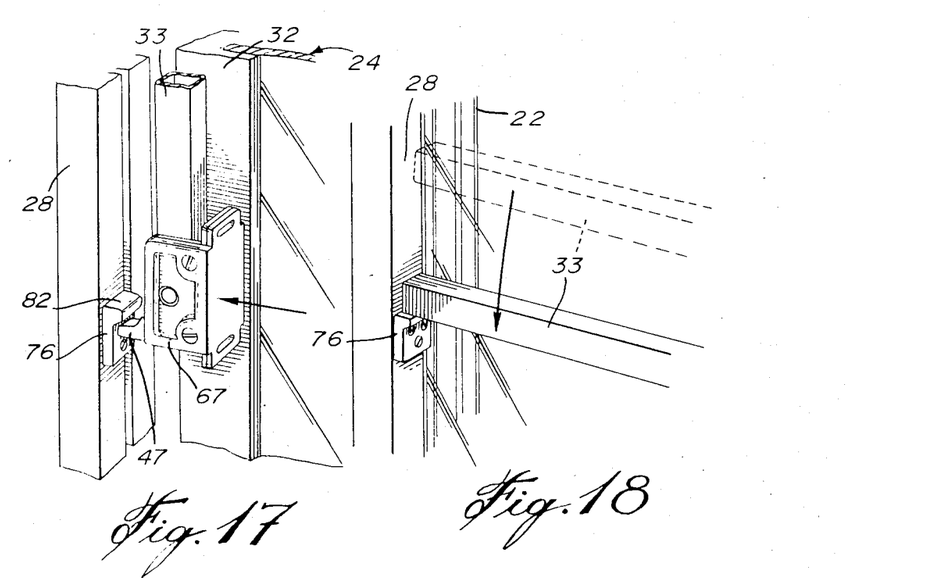
FIG. 17 is a partial perspective view of another arrangement similar to that of FIG. 15, with the door in open position.
FIG. 18 is a partial perspective view corresponding to the arrangement of FIG. 17, with the door (not shown) in closed position and with the locking bar in horizontal position supported at its outer end by the bar support fixed to the door opening jamb.

As shown in FIGS. 15 to 18, a bar support block 75, as shown in FIGS. 15 and 16, or 76, as shown in FIGS. 17 and 18, is provided to positively maintain the locking bar 33 in horizontal bar-locking position. Block 75 is used when it is desirable to have right angle flange 77 for securing the block to a flat surface by metal screws 78 in the case, for instance, the door opening jamb is provided, on the side facing the door to be locked, with ribs or sealing flanges 83. In this case, block 75 has a top and bottom shelf 80, 81 for selectively receiving the outer end of the horizontal bar, depending whether the stopping block 75 is installed on the left-hand side or the right-hand side of the door opening. The block 76 is preferably used when the rear of the block can be installed on a flat surface facing the door to be locked. In this case, the block has a single shelf 82 and the block can be installed also on the left-hand side or right-hand side of the door opening, depending on the door arrangement.

Figure 13:
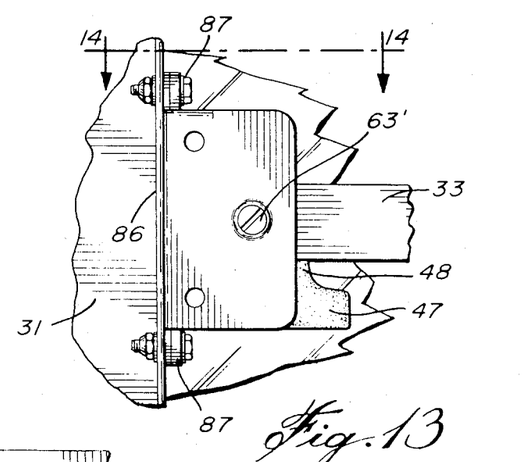
FIG. 13 is a side elevation similar to that of FIG. 8, but showing the bracket directly secured to the flange handle of the door sash.

Either one of the blocks 75, 76 serve also as a protector pad against which abuts the bumper body 47 when the door is open, said bumper body protruding outwardly from the casing 36, as clearly shown in FIGS. 13 and 17.

Because of its arrangement of anchoring holes and because of its symmetrical construction, the locking bar assembly of the invention can be installed in different ways, with the pivotal bracket assembly either directly to a door-opening jamb or directly to the side of a door sash or to to a handle flange of said sash. It can also be installed for rith-hand or left-hand operation. In FIGS. 1 to 9 inclusive, it is seen that the assembly of the casing 36, body 39 and cover 67 are affixed sideways to the outer vertical sash portion 31 of the outer door 22 by means of metal screws 74 and in such a position as to just clear the sealing flange 79 protruding from the lefthand jamb 27. In this case, the bar-stopping block 76, shown in FIG. 17, can be installed on the facing surface of inner sash portion 32 of the right-hand inner door 24.

Figure 11:
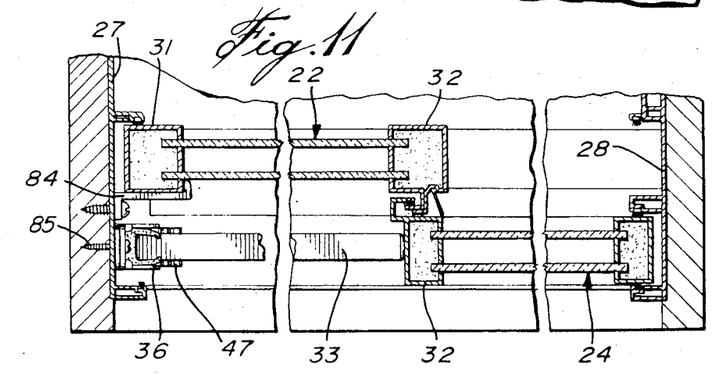
FIG. 11 is a cross-section of the patio door assembly with the locking bar in locked position, the bracket thereof being directly secured to the door opening jamb, as in FIG. 10.

This last-named installation is normally used when both patio doors are free to move horizontally in either direction within the door-opening frame. When one of the doors is permanently locked in closed position, as shown in FIG. 11, wherein it is seen that a strap member 84 locks the left-hand outer door in closed position, said strap 84 being screwed to the adjacent door jamb and overlying the outer vertical sash portion 31 of the outer door 22. In this case, screws 85 are passed through the registering slots 55, 57 and also slot 70, if the cover 67 is used, to apply the back face either of the cover or of the casing 36 directly to the face of the jamb opposite the door to be opened and locked in closed position.

Figure 12:
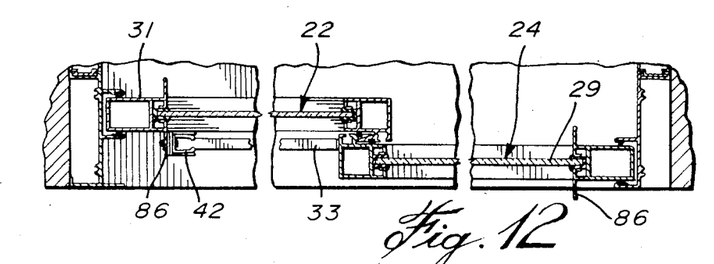
FIG. 12 is a plan section of the patio door assembly and of the type wherein the sash of the patio door is provided with a handle flange and showing the locking bar assembly attached to said handle flange, with the locking bar in horizontal door-locking position.
Figure 14:
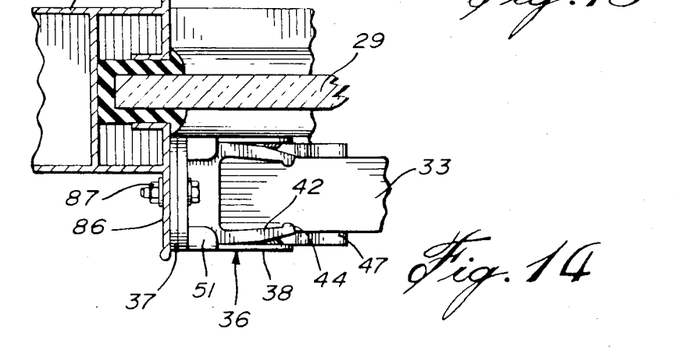
FIG. 14 is a cross-section taken along line 14—14 of FIG. 13.

FIGS. 12, 13, and 14 show that in the case that both doors are movable and that the outer door is provided with a handle flange 86, the latter can be used for fixing the pivotal bracket assembly, again using the slots 55 and 57 and also 70 if the cover 67 is used. The base plate of the cover or of the casing 36 is applied directly against the handle flange and attached thereto by means of bolts and nuts 87, as shown in FIG. 13 and 14.

FIGS. 15 and 16 show an arrangement wherein the outer door is on the right-hand side, looking outwardly to the exterior, in which case the pivotal bracket assembly is secured to the inner vertical sash portion 32 of the left-hand side inner door, with the bar-stopping block 75 secured to the right-hand door opening jamb 28.

In the arrangement of FIGS. 17 and 18, the left-hand door is the outer door as in FIG. 1. The bracket assembly is secured sideways to the inner vertical sash portion 32 of the left-hand inner door and the bar-stopping block 76 is secured to the left-hand jamb 28.

Referring again to FIG. 9, wherein the metal screws 74 are subjected to a shearing stress, it is possible, if found necessary, in addition to the use of the screws 74, to use a pressure-adhesive layer 88 between the contacting surfaces of the door sash and of either the cover 67 or of the casing 36, when the cover is not used. This pressure-adhesive layer can be applied either to the cover or the casing, with a removable or peelable protective sheet, which is removed when the bracket is installed.

FIG. 11 clearly shows also that the locking bar of the invention can be used in association with patio doors which have a double-glazing.

What I claim is:

1. A locking bar assembly for use between a vertical abutment member and a horizontally-slidable member of the type movable along a path between an opened position and a closed position, comprising: a locking bar having inner and outer end portions, a bracket assembly, means for mounting said bracket assembly to one of said members, pivotal means for mounting said locking bar adjacent its inner end portion on said bracket assembly for pivotal movement in a vertical plane about a pivotal axis carried by said bracket assembly between a generally horizontal locking position in which the outer end portion of said locking bar abuts the other of said members, and an upright position in which said locking bar permits opening movement of said slidable member towards said bracket assembly, at least the inner end portion of said bar having a generally square cross-section and having opposite side faces, a top face and an underface as defined when said locking bar is in locking position, said bracket assembly including a cross-sectionally U-shape metallic casing defining a base plate and side walls, said base plate being elongated and vertically extending when fixed in position by said mounting means, a transverse shaft carried by said side walls and on which said inner end portion of said locking bar is pivotally mounted, spacer means about said transverse shaft to produce a space between each side face of said locking bar and the respective side walls, a stabilizing member made of resilient material and located within the confines of said casing, said stabilizing member including an intermediate plate applied flat against said base plate intermediate said transverse shaft and said base plate, the top face of said locking bar abutting said intermediate plate in the upright position of said locking bar, a pair of transversely-spaced clasping arms and a bottom tongue integral with and projecting from said intermediate plate between said side walls, said clasping arms extending in said spaces at either side of said locking bar and located above said transverse shaft, said tongue extending below said locking bar, each clasping arm having a terminal inner shoulder, the two shoulders moving away from each other by slidable engagement with the opposite side faces of said locking bar during pivotal movement of the latter between said two positions and overlapping the underface of said locking bar when the latter is in said upright position, and a bumper body, of elastomeric material, fixed to said tongue, extending below said locking bar in either position of the latter, and extending beyond said side walls and from the underface of said locking bar when the latter is in upright position.

2. A locking assembly as defined in claim 1, wherein said bumper body has an upwardly extending transverse ridge contacting the underface of said locking bar when the latter is in locking position.

3. A locking bar assembly as defined in claim 1, wherein said mounting means include a first pair of screw-receiving openings made through said base plate and said intermediate plate above and below said clasping arms and said bumper body, respectively, for securing said bracket assembly to a surface normal to said vertical plane, and a second pair of screw-receiving openings made transversely through said side walls and through said intermediate plate for securing said bracket assembly to a surface parallel to said vertical plane.

* * * * *